2,979,527

PREPARATION OF UREA FROM CARBONYL SULFIDE AND AMMONIUM ACID SULFIDE

Fred Applegath and Raymond A. Franz, El Dorado, Ark., assignors to Monsanto Chemical Company, St. Louis, Mo., a corporation of Delaware No Drawing. Filed May 21, 1958, Ser. No. 736,692

2 Claims. (Cl. 260—555)

The invention relates to urea and more particularly to an improved process for its preparation.

It is known in the art that urea can be prepared by the reaction of carbonyl sulfide (COS) and ammonia. In the reaction of the prior art a small amount of $H_2S$ is usually added as a solubilizer for the reactants in the solvents normally used as the reaction medium. An object of this invention is to provide a satisfactory process for the preparation of urea in hydrocarbon reaction mediums. Further objects will become apparent from the description of the invention.

It has now been discovered that excellent yields of urea can be obtained by reacting COS with ammonium acid sulfide, preferably formed in situ, in a hydrocarbon medium. A comparison of the results of Examples I and II which follow illustrates the advantages of this invention.

Example I

To a 1.8 l. stainless steel bomb was charged 200 ml. benzene, 46 g. COS (0.77 mol), 30 g. $NH_3$ (1.76 mols) and 15 g. $H_2S$ (0.44 mol). The bomb was closed and shaken for two hours while maintaining a reaction temperature of about 100° C. The bomb was then vented and the reaction mixture washed from the bomb with water. The water layer was separated, filtered and evaporated to dryness recovering a 46% yield of urea based on COS.

Example II

To a 1.8 l. stainless steel bomb was charged 200 ml. benzene, 28 g. (0.46 mol) COS and one mol of $NH_4HS$ formed by charging to the bomb 17 g. $NH_3$ (1 mol) and 34 g. $H_2S$ (1 mol). The bomb was closed and shaken for two hours while maintaining a reaction temperature of about 120° C. The bomb was then vented and the reaction mixture washed from the bomb with water. The water layer was separated, filtered and evaporated to a dryness recovering a 75% yield of urea based on COS.

Example III

The procedure set forth in Example II is repeated with the exception that one mol of $NH_4HS$ is charged to the reactor in place of $NH_3$ and $H_2S$. Comparable results are obtained.

The reaction temperature in the process of this invention can be varied from about 60° C. to about 300° C. Preferably, the reaction temperature is maintained at a temperature in the range of 60° C. to about 160° C.

Reaction pressure is not significant. The reaction can be carried out at pressures below atmospheric, atmospheric and above atmospheric, even as high as 500 p.s.i.g.

Quantities of reactants can be varied substantially. Preferably at least two mols of $NH_4HS$ are used for each mol of COS. Excessive quantities of $NH_4HS$, five to ten mols of $NH_4HS$ for each mol of COS, can be used if desired, but offer no particular advantage.

The $NH_4HS$ used in this reaction can be added as such or, because of its instability, prepared in situ by the equimolecular reaction of $NH_3$ and $H_2S$.

Any liquid hydrocarbon can be used as the medium for this reaction. Aromatic hydrocarbons, such as benzene, toluene, xylenes, etc., and aliphatic hydrocarbons, such as petroleum ethers, cyclohexane, terpenes, decalin, etc. can be used. The quantity of hydrocarbon used can be varied substantially. The amount used is that amount necessary to provide a workable fluid medium.

After the reaction is complete, urea is recovered from the reaction mixture by any method well known to those skilled in the art.

What is claimed is:

1. A process for preparing urea which comprises reacting one molecular proportion of carbonyl sulfide with at least two molecular proportions of ammonium acid sulfide at an elevated temperature in the range of from about 60° C. to about 300° C. in a liquid hydrocarbon medium selected from a group consisting of benzene, toluene, xylene, petroleum ether, cyclo-hexane, and decalin.

2. A process as described in claim 1 wherein the ammonium acid sulfide is formed in situ by the reaction of substantially equimolecular proportions of ammonia and hydrogen sulfide.

References Cited in the file of this patent

UNITED STATES PATENTS

| | | |
|---|---|---|
| 2,681,930 | Franz | June 22, 1954 |
| 2,857,430 | Applegath et al. | Oct. 21, 1958 |

FOREIGN PATENTS

| | | |
|---|---|---|
| 124,520 | Austria | Sept. 25, 1931 |